Aug. 7, 1923. 1,463,886
J. E. GROSVENOR ET AL
LOOM FOR WEAVING VELVET PILE CARPETS AND OTHER PILE FABRICS
Filed Nov. 29, 1921  9 Sheets-Sheet 2
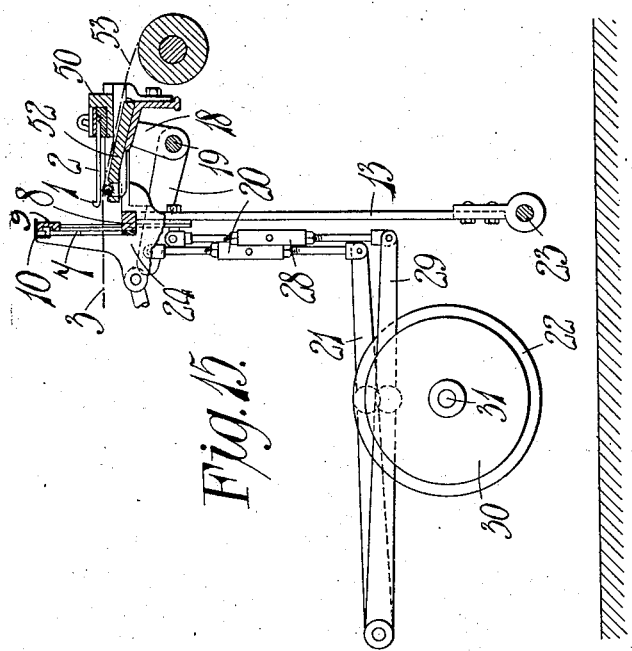
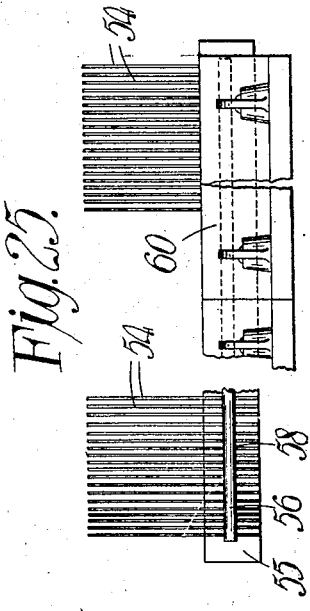
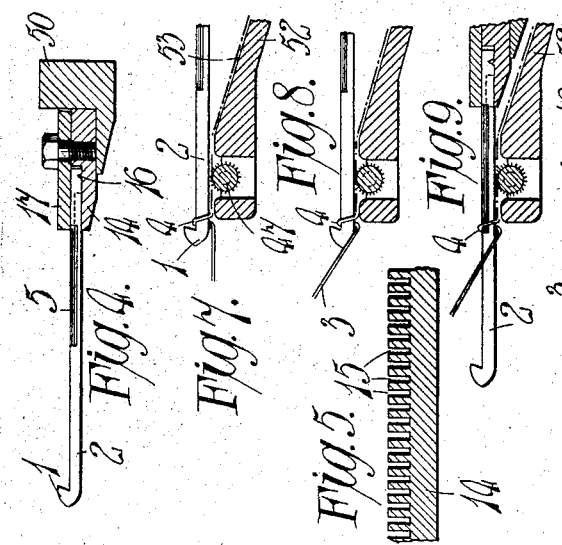

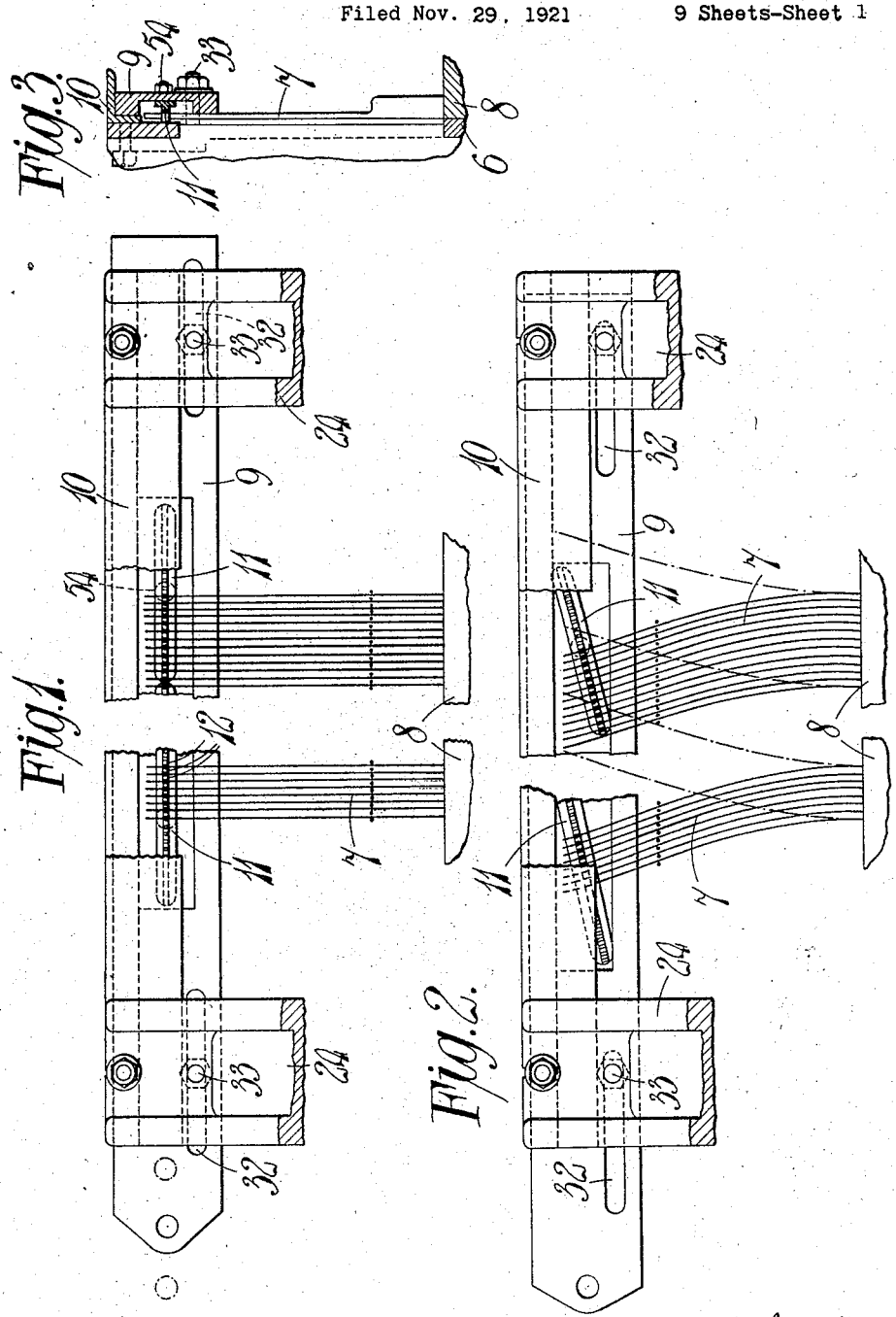

Aug. 7, 1923.

J. E. GROSVENOR ET AL 1,463,886

LOOM FOR WEAVING VELVET PILE CARPETS AND OTHER PILE FABRICS

Filed Nov. 29, 1921 9 Sheets-Sheet 3

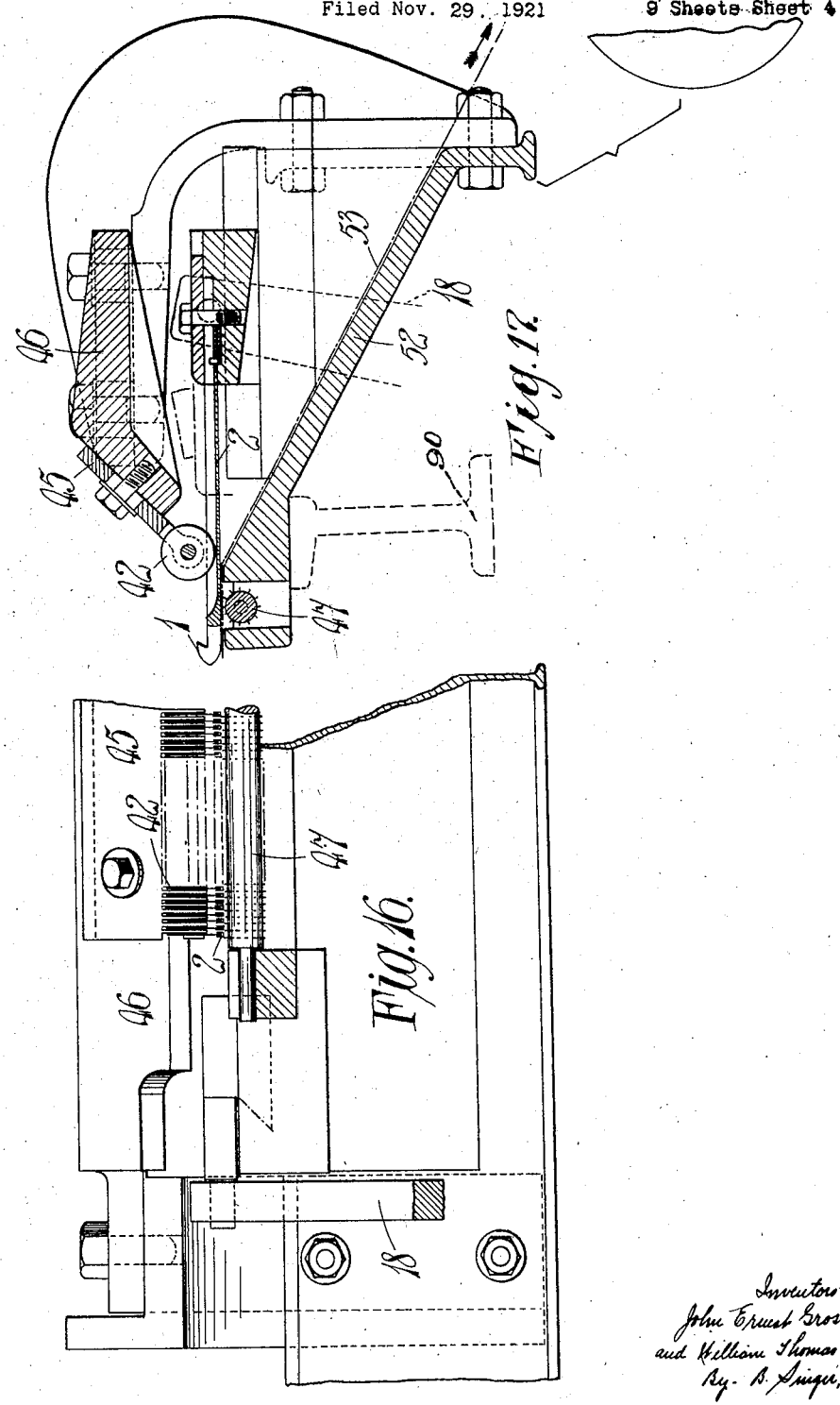

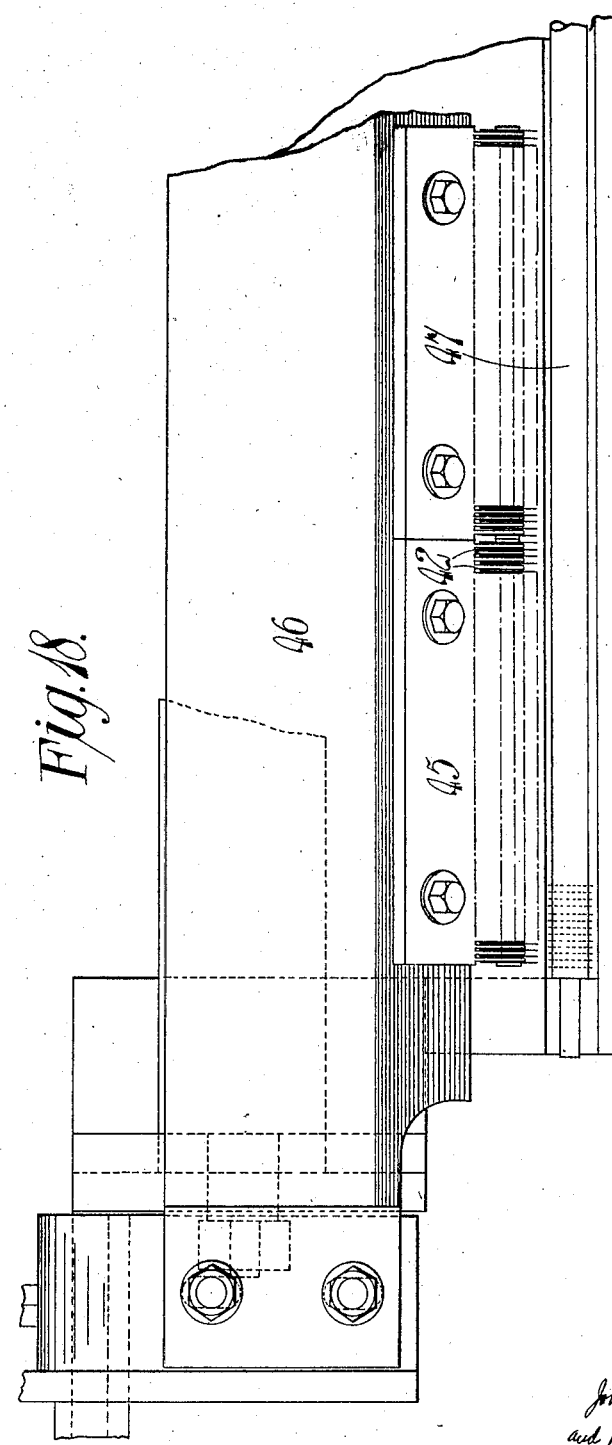

Aug. 7, 1923.  1,463,886
J. E. GROSVENOR ET AL
LOOM FOR WEAVING VELVET PILE CARPETS AND OTHER PILE FABRICS
Filed Nov. 29, 1921  9 Sheets-Sheet 6
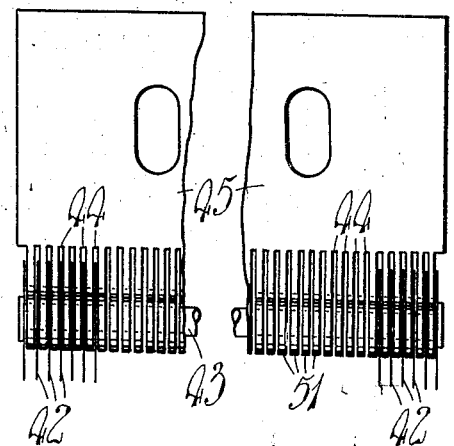
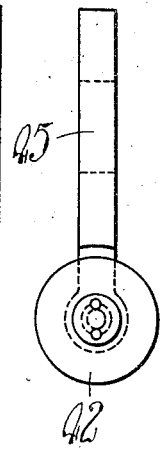
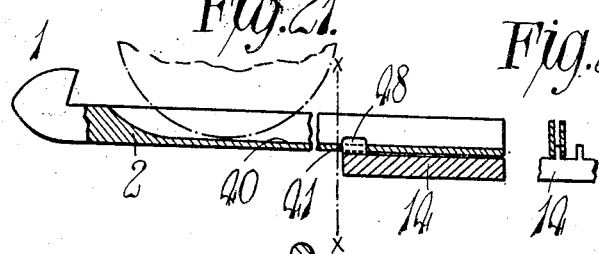
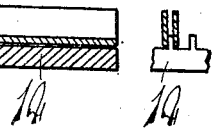
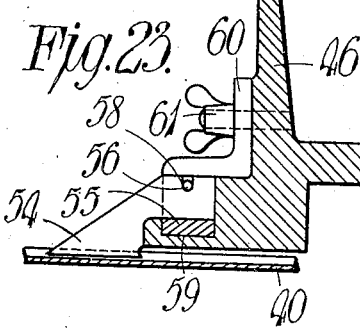
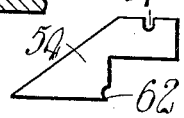

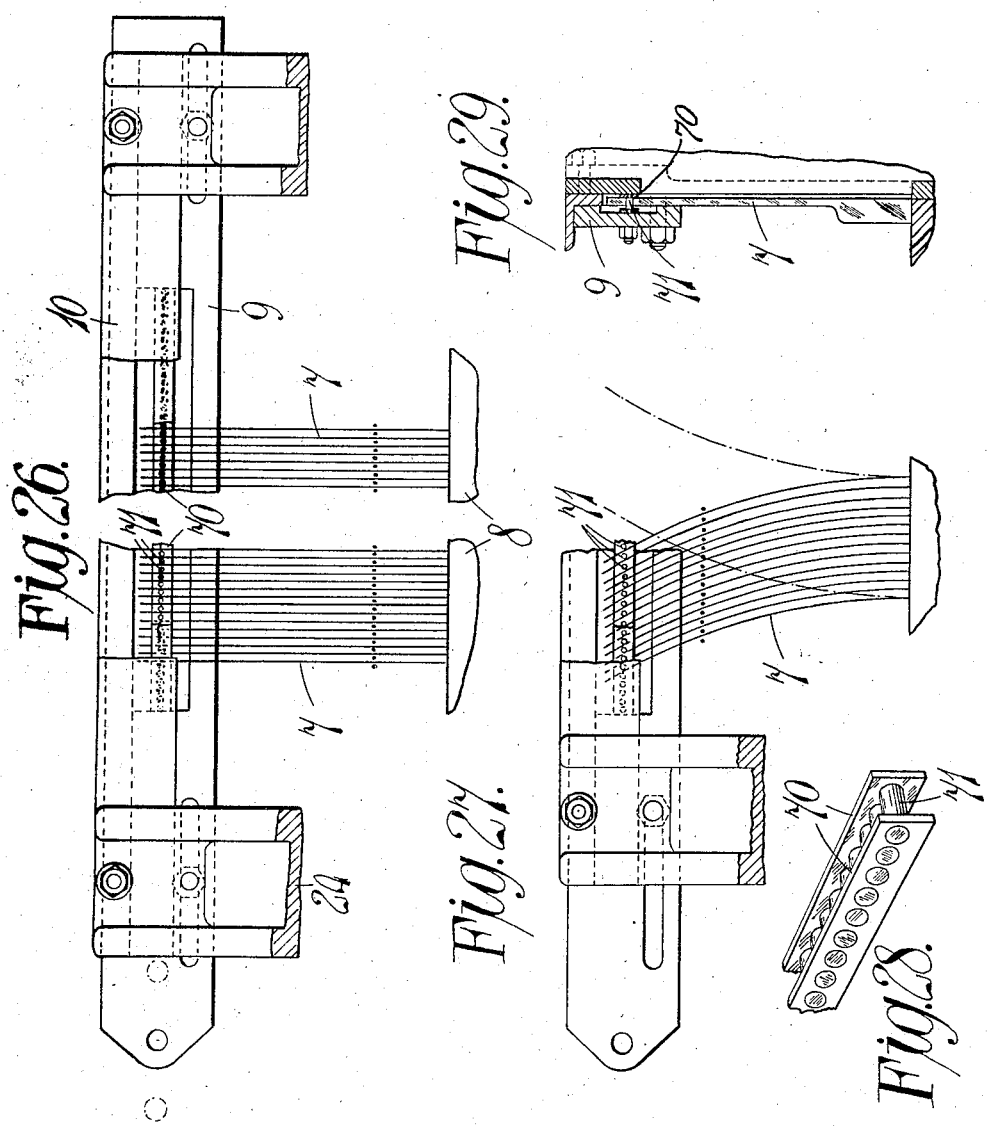

Aug. 7, 1923. 1,463,886
J. E. GROSVENOR ET AL
LOOM FOR WEAVING VELVET PILE CARPETS AND OTHER PILE FABRICS
Filed Nov. 29, 1921  9 Sheets-Sheet 8
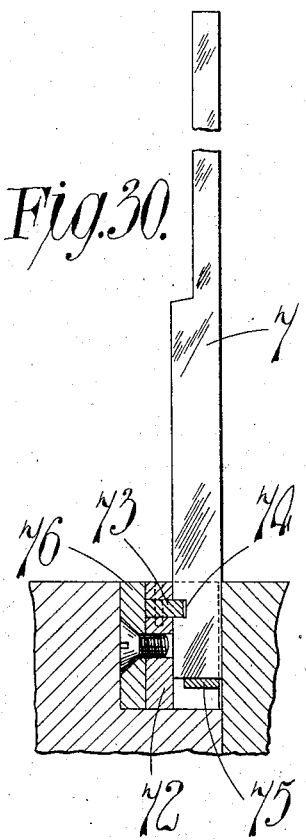
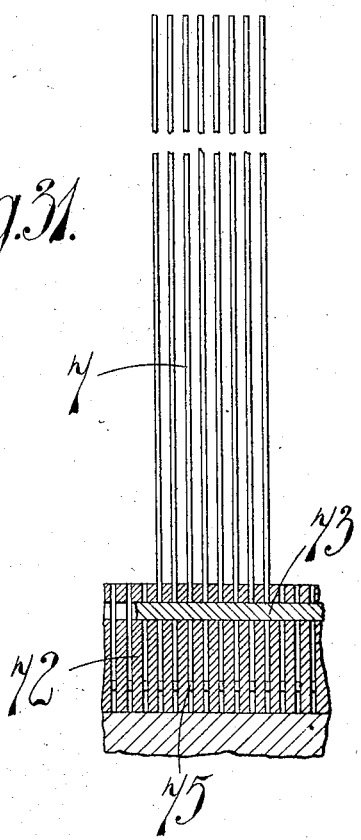
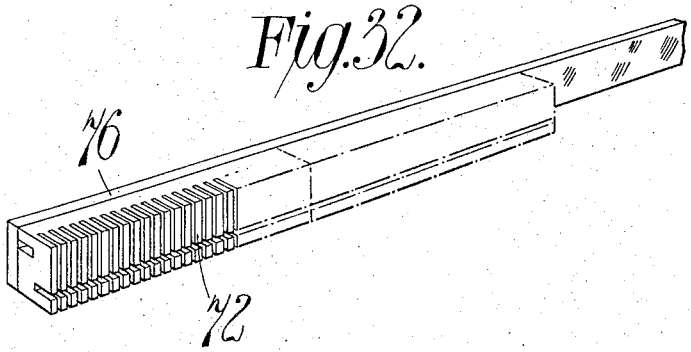

Aug. 7, 1923.  1,463,886
J. E. GROSVENOR ET AL
LOOM FOR WEAVING VELVET PILE CARPETS AND OTHER PILE FABRICS
Filed Nov. 29, 1921  9 Sheets-Sheet 9
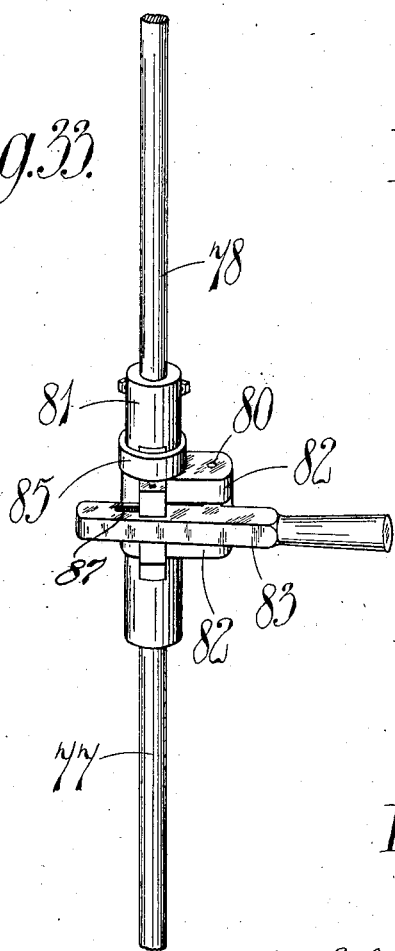
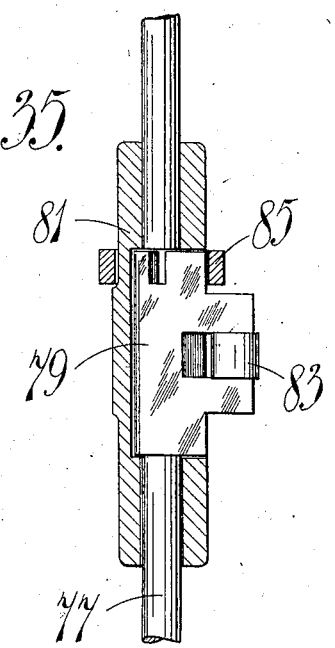
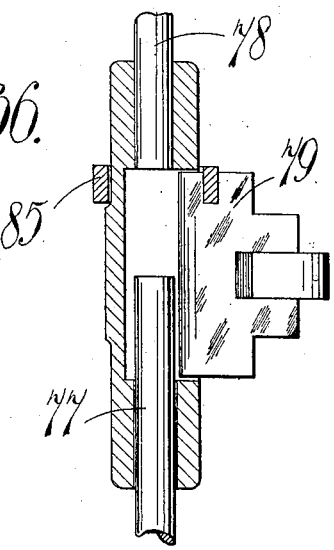
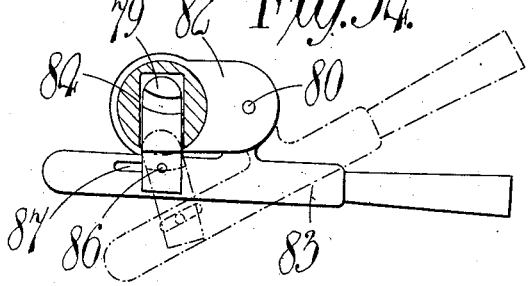

Patented Aug. 7, 1923.

1,463,886

UNITED STATES PATENT OFFICE.

JOHN ERNEST GROSVENOR, OF CORBETT, AND WILLIAM THOMAS PICKING, OF KIDDERMINSTER, ENGLAND.

LOOM FOR WEAVING VELVET PILE CARPETS AND OTHER PILE FABRICS.

Application filed November 29, 1921. Serial No. 518,606.

*To all whom it may concern:*

Be it known that we, JOHN ERNEST GROSVENOR and WILLIAM THOMAS PICKING, subjects of the King of Great Britain, residing at Bluntington House, Chaddesley Corbett, in the county of Worcester, England, and Foley Park, Kidderminster, in the county of Worcester, aforesaid, respectively, have invented certain new and useful Improvements in Looms for Weaving Velvet Pile Carpets and Other Pile Fabrics; and we do hereby declare the following to be a full, clear, and exact description of the same.

This invention has reference to looms for weaving velvet pile carpets and other pile fabrics and is applicable to any looms for weaving cut-pile carpets or other fabrics where the pile threads are brought to the fabric as warp ends and where the pile threads are selected for the surface by being raised above the other warp ends to form what is known as the "lash of pile threads" by which we mean that collection of warp pile threads which have been raised as aforesaid, whether the fabric is plain or patterned, whether the pattern is formed by jacquard or other mechanism or whether the pattern is formed by the pile threads being specially printed or coloured either before or after weaving.

Prior to this invention it has been proposed in a loom for weaving pile carpets and other pile fabrics to dispense with the usual transverse pile wires and the mechanism for operating them and instead thereof to employ a series of hooks, one hook for each course across the whole width of the fabric, said hooks having parallel shanks and hooked front ends and being suitably mounted longitudinally of the fabric on a support running across the front of the loom just above the woven cloth, said support for the hooks being capable of being moved to and fro so that when pushed forwards towards the lash of pile threads selected and raised to form the pile, the hooks are respectively inserted between the pile threads selected and raised, and as the hooks have each an upturned end forming a hook which is bent laterally at an angle or inclined outwardly to one side to engage with a respective pile thread, these threads are displaced laterally by the hooks and engaged by the hooks and drawn back with the hooks towards the cloth into a position over a plate fixed on the top of the breast beam 90 of the loom and there held to be bound in by the weft, each hook having a knife with a cutting edge sloping upwards near the rear end of the hook, which knife forms an integral part of each hook and so arranged that the knife moves forward with the hook and cuts a loop each time the hook moves forward, but leaving sufficient uncut loops on each hook to prevent the pile threads pulling out. Also in this arrangement the engagement of the selected pile threads with the hooks depended upon the shape of the upstanding end of the hook, which arrangement was not satisfactory, especially where, owing to more than one frame of pile yarns being employed with the jacquard or other mechanism to select the pattern threads, the pile threads are pushed aside from the centre of each course by the breaking up of the lash.

This invention is not to be confused with longitudinal wire looms wherein the wires are stationary and pass from the plate on the breast beam of the loom, between the dents of the reed and through the lash when the pile threads are raised. Such machines have been proposed and for engaging the pile threads over the longitudinal wires it has been suggested to use a laterally moving comb which is adapted to move the pile threads transversely. These machines are open to certain objections, the chief of which is perhaps that the stationary longitudinal wires which pass through the reed obscure the view of the operator so that he is unable to detect breakages and faults in the weaving. Also in these looms it is necessary to duplicate each lash in order that the pile threads may be returned to their original position between the wires, thus halving the speed of production.

According to the present invention we provide hooks arranged longitudinally with respect to the pile threads and normally exterior to the lash formed by the raising of the pile threads, but have an endwise movement to pass between the pile threads when in said raised position in combination with independent means for displacing the pile threads or the hooks or both the hooks and the threads laterally, so that the threads engage with the hooks for forming the pile loops.

The arrangement is preferably such that each selected pile thread is moved first upwardly and to one side with respect to the hook and whilst in this position the hook is moved forwardly, the selected pile thread subsequently being moved across to the other side of the hook and downwardly, after which the hook is moved back.

The lateral movements of the selected pile threads are preferably effected by lateral movements of the upper portions of the dents of the reed. To facilitate such movements the dents of the reed may be made flexible and they may be secured at the bottom in a bar attached to the lay bottom and in order to keep them in their proper spaced relationship whilst making their bending or angular movements, without causing them to be bent into a double curve, the upper end of each dent may be passed freely between the teeth of a comb like member which may be secured to the upper bar by means of a central pivot on which it can rock first inclining in one direction, then in the other as the dents are successively bent first in one direction then in the other. In wide looms it can be divided into suitably short sections, each section being centrally pivoted to the upper bar. Alternatively the comb like member may be mounted so as to have free vertical movements and slight lateral horizontal movement with respect to the upper bar.

The upper bar is preferably given its lateral movements by cam operated mechanism which is carried by a member which partakes of the longitudinal movements of the lay.

Another part of our invention relates to the means employed for severing the loops and for this purpose we preferably provide separate knives independent from the hooks but alternatively we may provide the hooks with knives or sharp edges arranged substantially parallel with or at a relatively slight inclination to the direction of longitudinal movement of the hooks, and such knives or sharp edges may either be formed as an integral part of the hooks or may be rigidly attached to the hooks. The arrangement is such that there are always a number of loops upon the hooks which loops are severed one by one to allow the woven fabric to leave the hooks which it does preferably in a downwardly inclined direction.

Referring to the drawings:—

Figure 1 is a view looking longitudinally with respect to the warp threads and showing the dents of the reed and a portion of the lay cap in their normal position.

Figure 2 is a similar view to Figure 1 showing the reeds bent to the left and also indicating in dot and dash lines the reeds bent to the right.

Figure 3 is a sectional view on line X—X of Figure 1.

Figure 4 is a sectional view in side elevation showing one of the hooks and the means employed for carrying it.

Figure 5 is a longitudinal sectional view showing the cross bar used for carrying the hooks.

Figure 6 is a plan view of the cross bar shown in Figure 5.

Figures 7, 8, 9, 10, 11 and 12 are sectional views in side elevation showing in successive stages the movements of a hook and a selected pile thread to illustrate the manner of forming the loops.

Figure 15 is a side view corresponding with Figure 13.

Figure 16 is a side view showing the preferred method of cutting the loops.

Figure 17 is a sectional end view corresponding with Figure 16.

Figure 18 is a plan view corresponding with Figure 16.

Figure 19 is a plan view upon an enlarged scale showing the method of supporting the knives.

Figure 20 is an end view corresponding with Figure 19.

Figure 21 is a sectional end view of one of the hooks.

Figure 22 is a view in cross section on line X—X of Figure 21.

Figure 23 is a sectional view showing an alternative apparatus for cutting the loops.

Figure 24 is a side view of one of the knives.

Figure 25 is a plan view showing the manner of mounting the knives.

Figure 26 is a view in side elevation showing the preferred method of securing the dents in spaced relationship in the lay cap.

Figure 27 is a similar view to Figure 26 showing the dents in their bent position.

Figure 28 is a perspective view showing the spacing member employed in the lay cap.

Figure 29 is a sectional view in side elevation corresponding with Figure 26.

Figure 30 is a sectional view showing the method of detachably mounting the dents in the lay bottom.

Figure 31 is a sectional view in side elevation corresponding with Figure 30.

Figure 32 is a perspective view showing the means for mounting the dents in the lay bottom.

Figure 33 is a perspective view showing the means whereby the means for raising the pile threads may be rendered inoperative.

Figure 34 is a sectional view in plan of the apparatus shown in Figure 33.

Figure 35 is a sectional view in side elevation showing the pile thread raising means in its operative position.

Figure 36 is a sectional view in side elevation showing the pile thread raising means in its inoperative position.

Figure 13:
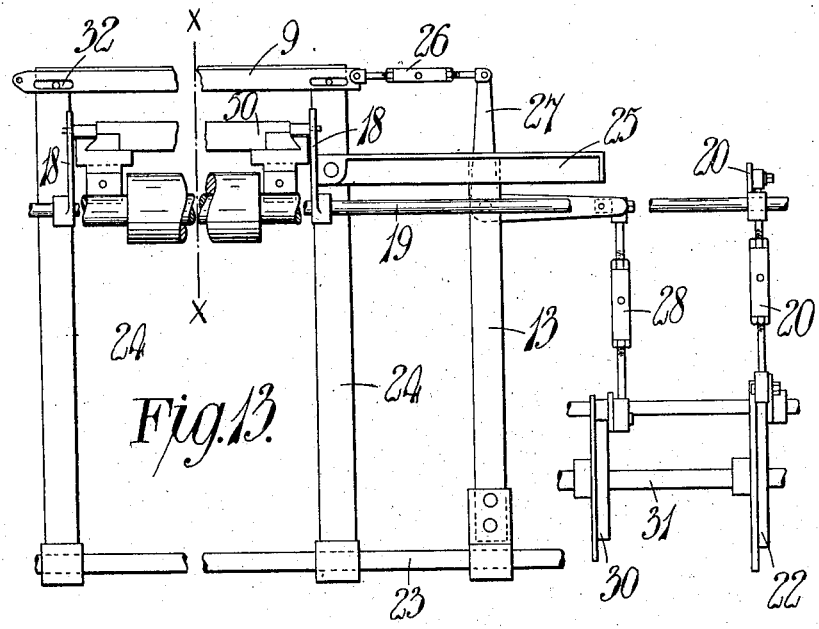
Figure 13 is a view looking longitudinally with respect to the warp threads and showing the mechanism for giving the dents of the reed their lateral motion and also showing the mechanism for moving the cross bar which carries the hooks.

In the preferred arrangement which is illustrated, the longitudinally moving upturned ends 1 of the hooks which are straight and vertical, are combined with means whereby the selected pile threads 3 are moved laterally to both sides alternately at the proper times to cause them to be engaged by the hooks and to be looped over the shanks 2 of the same to form the loops 4 which as the fabric is woven are progressively retired along the shanks 2 of the hooks, the rear parts of which are combined with independent knives 42 (see Figures 16 to 21) or are shaped as knives 5 which cut the loops 4 to form the pile.

In order to effect the necessary lateral movements of the selected pile thread, the reed is preferably constructed with flexible dents 7, the lower ends of which are secured in the bar 8 which is fixed in the lay bottom 6 whilst the upper bar 9 is movable laterally in the lay cap 10, thereby giving a lateral movement to comb-like members 11 having teeth 12 which project between the dents 7, thus inclining the dents 7 to either side of the vertical. To compensate for the angular movements of the dents 7 in relation to the horizontally moving upper bar 9 and to prevent a double curve being imparted to them, each comb-like member 11 is attached to the upper bar 9 by means of a central pivot 54 in such a manner as to permit it to assume a more or less inclined position in either direction to suit the inclined position of the dents 7, or the comb-like member 11 may be so held in the upper bar 9 as to be capable of free vertical and slight lateral movement in relation thereto and thus be enabled to assume the necessary inclination.

Referring to Figures 26, 27, 28 and 29—which show the preferred method of securing the dents in spaced relationship in the lay cap, the lay cap is provided with a fixed spacing member which consists of a pair of plates 70 between which pass a number of equally spaced cylindrical pins 71. This member is secured in the lay cap as shown in the drawings and the upper ends of the dents pass freely between the pins 71 so that when the dents are bent, being fixed at their lower ends and free at their upper ends, they assume a single curve as shown in Figure 27 as distinct from a double curve which would be obtained if they were fixed at their upper ends. The spacing member comprising the plate 70 and pins 71 is fixed to the sliding member of the lay cap and moves therewith.

Referring to Figures 30, 31 and 32, the lower ends of the flexible dents are placed in between the teeth of a comb 72 which is held in the lay bottom. A locating bar 73 is provided in the comb 72 and the dents are each provided with a notch 74 for engaging with the bar 73. The bottoms of the dents rest upon a bar 75. The locating bar 73 is held in position by a bar 76 as shown in Figure 30.

This method of mounting the dents detachably enables them to be renewed individually as may be required.

The dents 7 may be straight, but in order to avoid any risk of the dents 7 striking the forward ends of the hooks 1 and damaging the dents and hook, or possibly breaking the pile threads, the dents 7 may be shaped with a recess immediately above the part which beats up the weft to the loom plate as shown in Figures 3 and 12. This is more important if the hooks are shaped laterally as well as vertically as hereinafter described.

The operation of the loom is as follows: Assuming the hooks 1 are in their backward positions over the plate 52 and woven fabric 53 (see Figure 7) then the selected pile threads 3 rise and are moved laterally to the left (or right) of the hooks (see Figure 8). Now the hooks 1 go forward (see Figure 9). Then the pile threads 3 are carried over (see Figure 10) to the right (or left). Then the hooks move right back until the inner angle of the hook is immediately over the edge of the plate 52 (see Figure 11) causing the hooks to engage with the pile threads after which (see Figure 12) the pile threads drop down on to the right (or left) as the lay beats up the bottom shoot of weft, which has been inserted during the movement of the hooks. The hooks now make a short forward movement and back again for the purpose of tightening the loops. While the hooks make this short forward movement the shed is formed for the upper shoot which is beaten up by the lay to bend in the loops after the hooks have moved back again. In Figures 7 to 12 the lower weft is not shown for convenience in the drawings.

As will be understood, the lay has (as usual) a longitudinally reciprocating movement, whilst in addition the upper bar 9 carried in the lay cap 10 is given lateral oscillating movements to both sides of its central position, and the mechanism to effect these lateral oscillating movements is carried by a member 13 which has a longitudinally oscillating movement in unison with the lay. The upper bar 9 is provided with slots 32 which engage with studs 33 which project from the lay swords 24. In this way the upper bar 9 is mounted to have a limited reciprocating movement laterally with respect to the warp threads.

Figure 14:
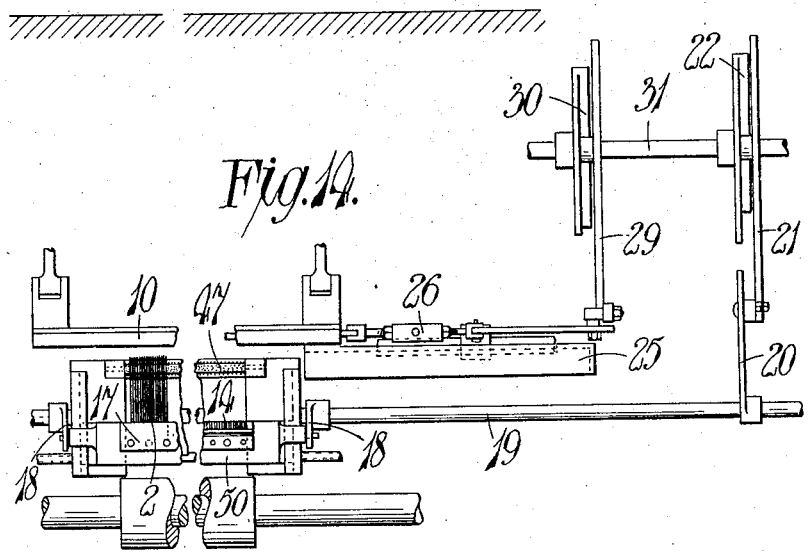
Figure 14 is a plan view corresponding with Figure 13.

The hooks 1 are mounted in a carrier 14 attached to a transverse bar 50 (see Figures 4 and 14) which is adapted for longitudinal movements, and for this purpose the hooks may be fitted in correctly spaced slots 15 in the carrier 14 and in order to retain the hooks in position the carrier may be provided with an inverted V or square shaped ridge 16 which engages with the corresponding notches on the undersides of the hooks 1, the hooks being finally secured in place by plate 17 which is clamped on the top of them. Or the hooks may be provided with an eye 41 (see Figure 21) either in the shank 2 or if the hook is grooved, as hereinafter described, in the groove 40, these eyes engaging with teeth 48 on the carrier 14, the hooks being finally secured by a plate as above described. Or the hooks may be soldered into the slots 15 in carrier 14 which in wide looms may be divided into sections of convenient length. The longitudinal movements of the hooks may be effected by two cranked arms 18 carried by transverse shaft 19 which is rocked by means of another crank and link 20 and a lever 21 controlled by a cam 22 on a shaft 31. The shaft 19 may be under the plate and behind the woven fabric as shown or may be in front of the loom and woven fabric to enable additional crank arms to be placed at suitable intervals across a wide loom.

To ensure that the member 13 which carries the mechanism for giving the lateral oscillations to the bar 9 moves in unison with the lay it is mounted at its lower end upon the shaft 23 which also carries the lay swords 24 and is secured at its upper end to the shuttle-box extension 25 of the lay bottom 6.

The upper bar 9 is given its oscillations by a link 26 attached to a bell crank lever 27 pivoted to member 13. The other end of the bell crank lever 27 is attached by universal joints to a link 28 pivoted to lever 29 which is rocked by a cam 30 mounted on shaft 31.

Independent knives are preferably employed for cutting the loops to form the pile and in this case the shanks of the hooks are preferably made of a narrow trough shape in cross section, or the openings formed therein may extend completely through the shanks. Instead of forming the solid hook with a trough or opening, the hooks may be built up each of two separate side members secured together in spaced relationship so as to leave an opening between them. Each knife enters a corresponding trough-shaped stem, the knives having their cutting edges inclined or curved upwardly and backwardly or forwardly from the upper trough service of the hooks so that as the weaving proceeds and the pile loops work against and past the knives, the loops are properly severed thereby as required. The said knives are preferably made as thin circular blades or discs (see Figures 16 to 21), a separate knife engaging in each trough-shaped channel as aforesaid. This channel extends for the necessary distance along the shank 2 of the hook to accommodate the knife during the longitudinal movement of the hook. The knives can conveniently be mounted on a member 45 slotted in the form of a comb having broad teeth 51, one knife in each slot 44, the knives being held in position by a shaft 43 which passes alternately through the centre of one of the knives and through a hole in one of the broad teeth 51, thus maintaining the knives in the proper pitch. The knives 42 may be mounted to revolve with cross shaft 43 or the knives may be mounted freely upon the shaft, when they will be caused to revolve slowly by the pile loops working against them or they may be caused to revolve more rapidly first in one direction and then in the other by friction of the sides of the grooves as the hooks move to and fro, or the knives may be fixed so as to be stationary in operation but capable of being occasionally turned so as to present a new cutting point to the loops when one point has become dulled. Alternatively, circular knives may be mounted on a cross shaft such as 43 but of stouter and more rigid construction and either the shaft to which the knives are fixed or the knives individually or in groups may be positively driven by a rotary movement in a direction which is opposite to the movement of the hooks. In order to maintain the shaft 43 carrying these circular knives in a horizontal position a stout cross bar 46 is fixed above the knives and carries the member 45. The member 45 and the shaft 43 may be divided into sections of convenient length and the cross bar 46 may in wide looms be stayed at suitable intervals to the upper front cross bar or other convenient part of the loom.

The upper surface of the cross bar 46 may be conveniently shaped to form a shelf with a beaded edge on which the weaver may place his scissors and other small articles and on which he can refill his shuttles. The cross bar 46 may, especially in wide looms, be conveniently made of channel section steel girder held at either end by suitable castings. As a modification, the knives may be of sector-like shape with their cutting edges entering the grooves and mounted on a stout rocking shaft so that the knives present a moving cutting surface to the loops so that the latter are easily and properly cut. Or the shaft, and consequently the knives, may be stationary, but easily adjustable so as to present a new point in the cutting edge of the knives to the loops when one point has become dull, or, in addition to being adjustable, the shaft and knives mounted upon it may be given a slight movement backwards and forwards. Instead of employing knives of circular shape, the knives may be made in the form of shoe-like blades 54 (see Figures 23–25) which may be held by a comb-like member 55 to which they may be conveniently secured by a rod 56 dropped alternately into grooves 57 in the blades 54 and grooves 58 in the teeth of the member 55. The member 55 may be held in the cross bar 46 by being placed in a recess 59 in the cross bar 46 and secured by an angle plate 60 by a thumb screw 61. It will be understood that in this method the blades 54 will be stationary and will cut the loops as they work against them as the fabric is woven. The member 55, rod 58, and the angle plate 60 may all be divided into sections of convenient length so that any individual blade may be easily and quickly removed and replaced by removing the corresponding section of the angle plate 60. If it is desired to form the cross bar 46 of channel section steel girder as hereinbefore mentioned the groove 59 may be made in a suitable casting rigidly attached to the channel section girder. Instead of using a rod such as 56 for locking or retaining the plates 54, the said plates may be retained in position by providing a downwardly projecting lip at the forward edge of the angle plates 60. In such a construction the groups 57 and 58 would preferably be omitted.

As will be seen clearly from Figures 23 and 24, each blade is provided with a pointed heel portion 62. This heel portion is of course disposed at the bottom of the groove in the hook, and as the hook reciprocates, this heel portion serves to remove fluff which may accumulate in the groove in the shank of the hook. In a modification, the rear portion of the shanks 2 of the hooks may be provided with a sharp cutting edge 5 (see Figures 4 and 7 to 12) which severs the loops as the woven fabric is drawn down the inclined plate 52 by the usual take up motion.

The inclined plate 52 is provided at its forward end with a roller 47 having a number of small spikes either at each end or throughout its length. These spikes may be placed spirally as the thread of a screw. This spiked roller is similar to that sometimes used to maintain the full width of the woven fabric, but it is here used in combination with the pile forming and pile cutting mechanism to prevent the lateral displacement of the woven fabric when the pile threads are moved laterally.

The depth of the pile can be regulated either as is preferred and as hereinbefore particularly described and shown in the annexed drawings by the depth of the shaft of the hook, or by the hook drawing the pile thread a greater or less distance beyond the edges of the loom plate, thus making the loop of pile thread greater or less.

Any other suitable means may be employed for imparting the proper lateral movements to the selected pile threads at the proper times, such for instance as a laterally movable comb supported by the lay cap in front of the reed and made with teeth to engage the pile threads. The necessary lateral movements may be imparted to the comb by similar mechanism to that described for operating the upper bar of the reed 9 (see Figures 13, 14 and 15). The necessary lateral movements of the selected pile threads can (as a further modification) be obtained by the whole reed being moved sideways or the upper part of the dents of the reed may be of a bent or zigzag shape so as to impart the necessary lateral movements to the pile threads as they pass up and down between the dents.

In combination with any of the hereinbefore described methods of imparting lateral movements to the pile threads, the upturned portion of the hook may be vertical only as is preferred, or it may be shaped laterally also to assist in the engagement of the pile thread as has been done prior to our invention.

The hooks are preferably moved to and fro simultaneously as is hereinbefore particularly described and shown on the appended drawings but if preferred in very wide looms, the hooks are moved successively by means of a bowl, wedge, or other contrivance moving along the support and so arranged that as it passes each hook it pushes it into the lash; the hook is withdrawn either at once by the passing of the bowl or other contrivance or by the bowl or other contrivance on its return journey. One, two, or more bowls, or other contrivances can be used to the width of the loom.

Any suitable form of raising means for the pile yarns may be used for forming the lash. Such means are preferably controlled or operated by a cam operated rod moving in an endwise direction. When the length of pile fabric has been woven it is the custom to weave a few rows of fabric without pile, these rows intervening between one length of pile fabric and another. In order to provide for this we prefer to provide means for rendering the pile thread raising means inoperative at will. Such means is shown in Figures 33, 34, 35 and 36 wherein the rod 77 controls or operates the pile thread raising mechanism. The rod 77 has a movement in an endwise direction and this movement is normally transmitted to the rod 78 through a distance piece 79, a pivot 86 passing through a slot 87 in a lever 83, and can be swung aside as shown in Figures 34 and 36, so as to allow the rod 77 to reciprocate without moving the rod 78. Mounted upon the lower part of the rod 78 is a sleeve 81 which incorporates lugs 82 for carrying a hinge pin 80. The lever 83 is mounted upon the pin 80. The sleeve 81 is provided with a slot 84 into which the distance piece 79 can be moved.

A movable collar 85 may be provided which can be dropped over the upper end of the distance piece 79 as shown in Figure 35 for retaining it in the position shown therein. This collar, however, may be moved upwardly to allow of the distance piece 79 being moved aside.

What we claim then is:—

1. A loom for weaving pile fabrics having in combination means for raising and lowering the warp pile threads, hooks arranged longitudinally with respect to the warp pile threads and normally exterior to the raised warp pile threads, means for moving the hooks in an endwise direction to make their ends pass between the threads when in said raised position, a single reed, means for moving the dents of said reed laterally to displace the threads laterally with respect to the hooks and make the selected threads engage with the hooks for forming the pile loops, and means for moving said reed towards and away from the hooks to beat up the weft.

2. A loom for weaving pile fabrics having in combination means for raising and lowering the warp pile threads, hooks arranged longitudinally with respect to the warp pile threads and normally exterior to the raised warp pile threads, a single reed, means for moving the dents of said reed laterally, first to one side and subsequently to the other side of its normal position to displace the threads laterally with respect to the hooks and thereby make the selected threads engage with the hooks for forming the pile loops, means for moving the hooks in an endwise direction to make their ends pass between the threads after the reed has moved to one side, but before it moves to the opposite side, and means for moving said reed towards and away from the hooks to beat up the weft.

3. A loom for weaving pile fabrics having in combination means for raising and lowering the warp pile threads, hooks arranged longitudinally with respect to the warp pile threads and normally exterior to the raised warp pile threads, means for moving the hooks in an endwise direction to make their ends pass between the threads when in said raised position, a reed for the warp pile threads disposed always in advance of the hooks but adapted to move towards and away from said hooks, means for moving the dents of said reed laterally to move the threads laterally with respect to the hooks and make the selected threads engage with the hooks for forming the pile loops, and means for moving said reed towards and away from the hooks to beat up the weft.

4. A loom for weaving pile fabrics having in combination means for raising and lowering the warp pile threads, hooks arranged longitudinally with respect to the warp pile threads and normally exterior to the raised warp pile threads, a reed for the warp pile threads disposed always in advance of the hooks but adapted to move towards and away from said hooks, means for moving the dents of said reed laterally, first to one side and subsequently to the other side of their normal position, to displace the threads laterally and thereby make the selected threads engage with the hooks for forming the pile loops, means for moving the hooks in an endwise direction to make their ends pass between the threads after the reed has moved to one side, but before it moves to the opposite side, and means for moving said reed towards and away from the hooks to beat up the weft.

5. In a loom for weaving pile fabrics in combination, means for raising and lowering the warp pile threads, hooks arranged longitudinally with respect to the warp pile threads and normally exterior to the raised warp pile threads, means for moving the hooks in an endwise direction to make their ends pass between the threads when in said raised position, a reed, the dents of which are flexible, said dents being detachably mounted at one end in the lay bottom and secured to a laterally movable bar in the lay cap, and operating means for moving said bar whereby the threads can be moved laterally with respect to the hooks so as to make the selected threads engage with the hooks for forming the pile loops.

6. In a loom for weaving pile fabrics in combination, means for raising and lowering the said warp pile threads, hooks arranged longitudinally with respect to the warp pile threads and normally exterior to the raised warp pile threads, means for moving the hooks in an endwise direction to make their ends pass between the threads when in said raised position, a reed the dents of which are flexible, a lay bottom, a lay cap, a spacing member for the dents in the lay cap, pins in said spacing member, said dents being secured at one end in the lay bottom and having their other ends passing freely between said pins in the spacing member of the lay cap to space same properly to prevent them from being bent into a double curve, and operating means for moving said spacing member whereby the threads can be moved laterally with respect to the hooks so as to make the selected threads engage with the hooks for forming the pile loops.

7. In a loom for weaving pile fabrics in combination, means for raising or lowering the said warp pile threads, hooks arranged longitudinally with respect to the warp pile threads and normally exterior to the raised warp pile threads, means for moving the hooks in an endwise direction to make their ends pass between the threads when in said raised position, a reed the dents of which are flexible, a lay bottom, a lay cap, a spacing member in the lay cap for the dents, said dents being fixed at one end in the lay bottom and engaging at their free ends with the spacing member, and operating means for moving said spacing member whereby the threads can be moved laterally with respect to the hooks so as to make the selected threads engage with the hooks for forming the pile loops, said operating means partaking of the longitudinal movements of the lay.

8. In a loom for weaving pile fabrics in combination, hooks arranged longitudinally with respect to the pile threads and normally exterior to the raised pile threads, means for moving the hooks in an endwise direction to make their ends pass between the threads when in said raised position, means for effecting relative lateral movement between the threads and the hooks so as to make the selected threads engage with the hooks for forming the pile loops, channels in the shanks of said hooks, a toothed bar arranged transversely across said shanks and knives fixed between the teeth of said bar, said knives projecting into said channels for severing the loops after they have been bound in by the weft.

9. In a loom for weaving pile fabrics in combination, hooks arranged longitudinally with respect to the pile threads and normally exterior to the raised pile threads, means for moving the hooks in an endwise direction to make their ends pass between the threads when in said raised position, means for effecting relative lateral movement between the threads and the hooks so as to make the selected threads engage with the hooks for forming the pile loops, channels in the shanks of said hooks, a toothed bar arranged transversely across said shanks and knives fixed between the teeth of said bar, said knives projecting into said channels for severing the loops after they have been bound in by the weft, the cutting edges of said knives being inclined to the plane in which the hooks move.

10. In a loom for weaving pile fabrics in combination, hooks arranged longitudinally with respect to the pile threads and normally exterior to the raised pile threads, means for moving the hooks in an endwise direction to make their ends pass between the threads when in said raised position, means for effecting relative lateral movement between the threads and the hooks so as to make the selected threads engage with the hooks for forming the pile loops, channels in the shanks of said hooks, a toothed bar arranged transversely across said shanks and knives fixed between the teeth of said bar, said knives projecting into said channels for severing the loops after they have been bound in by the weft, said knives having projecting heel pieces which are located in said channels and serve to remove fluff therefrom.

In witness whereof we affix our signatures.

JOHN ERNEST GROSVENOR.
WILLIAM THOMAS PICKING.